United States Patent
Burlingame

(10) Patent No.: US 7,711,141 B2
(45) Date of Patent: May 4, 2010

(54) SYSTEMS AND METHODS FOR IMAGING STREAMING IMAGE DATA COMPRISING MULTIPLE IMAGES ON AN IMAGE-BY-IMAGE BASIS

(75) Inventor: John J. Burlingame, Camas, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 798 days.

(21) Appl. No.: 11/216,892

(22) Filed: Aug. 31, 2005

(65) Prior Publication Data

US 2007/0046956 A1    Mar. 1, 2007

(51) Int. Cl.
G06K 9/00 (2006.01)
(52) U.S. Cl. ...................................... 382/100
(58) Field of Classification Search .................. 382/112, 382/254, 276, 100; 358/1.1, 1.15–1.17; 348/61–69
See application file for complete search history.

(56) References Cited

U.S. PATENT DOCUMENTS

| | | | |
|---|---|---|---|
| 3,772,655 A | 11/1973 | Bluethman et al. | |
| 5,422,996 A * | 6/1995 | Patil et al. | 345/501 |
| 6,147,742 A * | 11/2000 | Bell et al. | 355/27 |
| 2002/0052897 A1* | 5/2002 | Nishikawa et al. | 707/527 |
| 2003/0160975 A1 | 8/2003 | Skurdal et al. | |

FOREIGN PATENT DOCUMENTS

| | | |
|---|---|---|
| JP | 2003163779 | 6/2003 |
| JP | 2004-074420 | 3/2004 |

\* cited by examiner

*Primary Examiner*—Samir A. Ahmed
*Assistant Examiner*—Atiba O Fitzpatrick
(74) *Attorney, Agent, or Firm*—Austin Rapp & Hardman

(57) ABSTRACT

Streaming image data comprising multiple images is received at an imaging device. Image boundaries are identified within the streaming image data. The streaming image data is transformed to an image-ready format that may be directly processed by a marking engine. Imaging (such as printing) of transformed image data for received images is initiated without waiting for all the streaming data to be received at the imaging device.

20 Claims, 9 Drawing Sheets

| Duplex Settings 347 | N-Up Settings 349 | Number of Images to be Stored 351 |
|---|---|---|
| Inactive | Inactive | 1 |
| Inactive | Active | N |
| Front-Page-First | Inactive | 1 |
| Back-Page-First | Inactive | 2 |
| Front-Page-First | Active | N |
| Back-Page-First | Active | 2N |

SYSTEMS AND METHODS FOR IMAGING STREAMING IMAGE DATA COMPRISING MULTIPLE IMAGES ON AN IMAGE-BY-IMAGE BASIS

TECHNICAL FIELD

The present invention relates generally to computers and computer-related technology. More specifically, the present invention relates to systems and methods for processing streaming imaging jobs on an image-by-image basis.

BACKGROUND

Imaging devices are frequently used in many aspects of business, industry, and academic endeavors. The term "imaging," as used herein, should be interpreted broadly to include any process for producing a copy of a document onto paper, a computer screen, an electronic image, or the like. Examples of imaging devices include printers, facsimile devices, copiers, scanners, display monitors, multi-function peripherals (MFPs), imagesetters, platesetters, filing devices, web publishing devices, and so forth. Documents that are sent to a printing device for printing are sometimes referred to as "print jobs."

Printers (one kind of imaging device) are used with computers to print various kinds of items, including letters, documents, pictures, etc. Many different kinds of printers are commercially available. Ink jet printers and laser printers are common among computer users. Ink jet printers propel droplets of ink directly onto the paper. Laser printers use a laser to print. Many imaging devices can generate scanned image data. For example, some imaging devices include scanners, which can scan a document to provide scanned image data. It is also possible that an imaging device will be able to read scanned image data from a storage device. There may also be other ways in which an imaging device may be provided with or otherwise obtain scanned image data. Copiers and facsimile devices are also commonly used imaging devices.

Unfortunately, processing, transmitting, and storing image data to create an image can be a time-consuming process and can significantly delay generation of the image. Persons using an imaging device can become frustrated if the processing time is slow. For example, if the first page of an imaged document is delayed, the person who initiated the imaging process may wonder whether the image data has been lost in transit or whether a network over which the image data was transmitted is not functioning properly.

One particularly time-consuming process is imaging multiple images (e.g., tagged image file format (TIFF) images having multiple pages or concatenated joint photographic experts group (JPEG) files). When this type of image data is sent to an imaging device, creation of an image derived from the pertinent image data does not begin until all the image data has been received by the imaging device, creating a significant delay in imaging a first sheet or page thereof.

Accordingly, benefits may be realized by improved systems and methods for rapidly generating images from image data comprising multiple images. Some exemplary systems and methods for rapidly generating images from image data comprising multiple images are described herein.

BRIEF DESCRIPTION OF THE DRAWINGS

Exemplary embodiments of the invention will become more fully apparent from the following description and appended claims, taken in conjunction with the accompanying drawings. Understanding that these drawings depict only exemplary embodiments and are, therefore, not to be considered limiting of the invention's scope, the exemplary embodiments of the invention will be described with additional specificity and detail through use of the accompanying drawings in which:

FIG. 3 is a table indicating the number of images to be stored before imaging is initiated according to one embodiment of the systems and methods disclosed herein;

DETAILED DESCRIPTION

Figure 1:
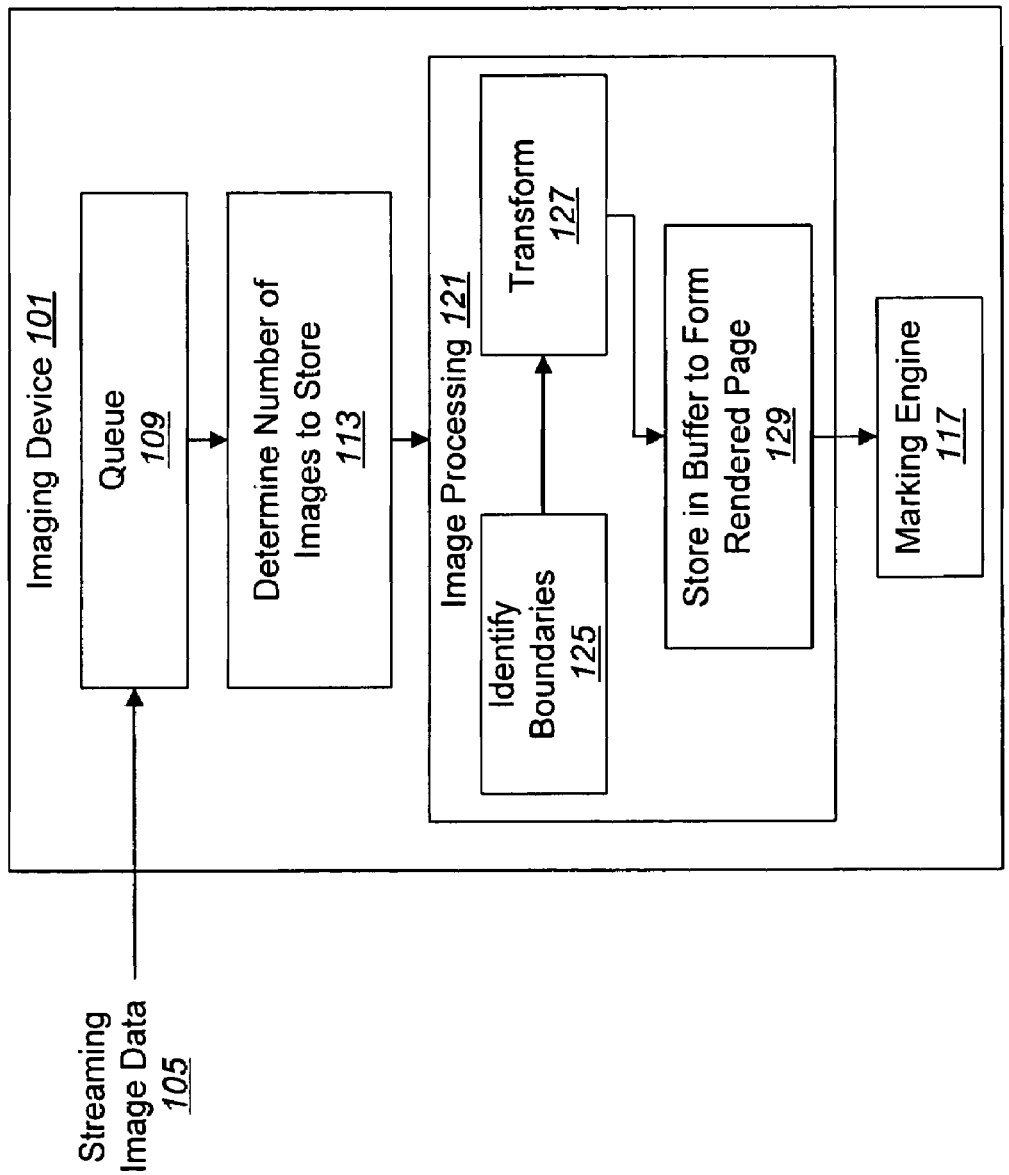
FIG. 1 is a block diagram illustrating one embodiment of an imaging device for creating an image using streaming image data comprising multiple images.

A method for imaging streaming image data including multiple images on an image-by-image basis is disclosed. Streaming image data comprising multiple images is received at an imaging device. A number of images to be stored before initiating imaging is determined. Image boundaries within the streaming image data for each of the images to be stored are identified. Image data corresponding to each of the images to be stored is transformed into image data in an image-ready format. The transformed image data is stored in a buffer to form at least one rendered page that may be directly processed by the marking engine. One of the rendered pages is transmitted to a marking engine for imaging without waiting for all the streaming image data to be received at the imaging device.

In one embodiment, the imaging device is an embedded device. In one configuration, the streaming image data does not need to be processed by a driver before processing by the imaging device.

Identifying image boundaries within the streaming image data may comprise identifying at least one image boundary marker within the streaming image data. Alternatively, identifying image boundaries within the streaming image data may comprise computing a specified offset within the streaming image data.

In one embodiment, the number of images to be stored before initiating imaging is determined by duplexing and N-up settings for the imaging device.

In one embodiment, when the N-up setting is active, storing comprises storing the transformed image data in rows and columns to form one of the rendered pages.

In one embodiment, when the N-up setting is active, and when the duplex setting is set to back-page-first, the number of images to be stored before initiating imaging is 2N, wherein N is the number of images to be imaged on one side of an imaging medium.

An imaging device configured to implement the methods described above is also disclosed. The imaging device includes a processor, and memory and a marking engine in electronic communication with the processor. Instructions are stored in the memory to implement the methods described above. In one embodiment, the imaging device is a printing device.

Various embodiments of the invention are now described with reference to the Figures, where like reference numbers indicate identical or functionally similar elements. The embodiments of the present invention, as generally described and illustrated in the Figures herein, could be arranged and designed in a wide variety of different configurations. Thus, the following more detailed description of several exemplary embodiments of the present invention, as represented in the Figures, is not intended to limit the scope of the invention, as claimed, but is merely representative of the embodiments of the invention.

The word "exemplary" is used exclusively herein to mean "serving as an example, instance, or illustration." Any embodiment described herein as "exemplary" is not necessarily to be construed as preferred or advantageous over other embodiments. While the various aspects of the embodiments are presented in drawings, the drawings are not necessarily drawn to scale unless specifically indicated.

Many features of the embodiments disclosed herein may be implemented as computer software, electronic hardware, or combinations of both. To clearly illustrate this interchangeability of hardware and software, various components will be described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Where the described functionality is implemented as computer software, such software may include any type of computer instruction or computer executable code located within a memory device and/or transmitted as electronic signals over a system bus or network. Software that implements the functionality associated with components described herein may comprise a single instruction, or many instructions, and may be distributed over several different code segments, among different programs, and across several memory devices.

FIG. 1 is a block diagram illustrating one embodiment of an imaging device 101 for creating an image using streaming image data 105 comprising multiple images. Imaging devices 101 may be embodied in a wide variety of configurations. For example, imaging devices 101 include printers, facsimile devices, copiers, scanners, display monitors, multi-function peripherals (MFPs), imagesetters, platesetters, filing devices, web publishing devices, and so forth.

As indicated in FIG. 1, the imaging device 101 receives streaming image data 105. Streaming image data 105 is any type of data or information that may be used directly or through a conversion process to produce an image and is provided in a streaming, or sequential, manner. The streaming image data 105 may be transmitted to or received by the imaging device 101 in a number of different ways. For example, the streaming image data 105 may be produced by a computing device in the form of a print job and then transmitted to the imaging device 101. Alternatively, as another example, the streaming image data 105 may be presented to the imaging device 101 through a portable flash memory storage device (e.g., a thumb drive) placed in communication with the imaging device 101.

An "image" may be embodied in a number of different ways. For example, an image may be a separate file that has been concatenated with other image files to form the streaming image data 105 (e.g., concatenated joint photographic experts group (JPEG) files). An image, if the imaging medium is a display screen, may be the portion of streaming image data 105 that can be entirely displayed at a single time on the display screen. In another embodiment, each separate page within the multi-page image file comprises a separate image (e.g., tagged image file format (TIFF) images having multiple pages)

The streaming image data 105 is received at a queue 109 within the imaging device 101. The queue 109 temporarily stores the streaming image data 105 until it can be processed further by the imaging device 101. The queue 109 may further be used for spooling of streaming image data 105. In an alternative embodiment, the imaging device 101 may include a queue 109 and a separate spooling device.

The queue 109 may comprise memory of different types, such as volatile and nonvolatile memory. In one embodiment, volatile memory (e.g., random access memory (RAM)) is used because of its rapid read/write speeds.

Thereafter, it is determined 113 how many images within the streaming image data 105 are to be stored before imaging is initiated (e.g., before processed image data is transmitted to the marking engine 117 for imaging). As will be explained in greater detail below, multiple images may be imaged to a single sheet of an imaging medium (e.g., a sheet of paper). Accordingly, before any imaging is initiated, one must determine how many images are to be placed on a sheet of an imaging medium.

A sheet of an imaging medium may be embodied in a variety of different ways. The sheet could include a piece of paper having two printable sides or, alternatively, a printing medium having only a single side that may be properly printed on, such as a coated piece of photo printing paper. Alternatively, a sheet could include a discrete image or grouping of images to be shown on a display device, often, but not always, having a common background color or theme.

In one implementation of the systems and methods disclosed herein, the number of images to be stored before initiating imaging may be controlled by duplexing and/or N-up settings for the imaging device 101. The duplexing and N-up settings may be established in a number of different ways. For example, the settings may be configured directly by a user at the imaging device 101 (such as by a touchpad or other input device) or may be established by control commands embedded within the streaming image data 105.

Duplexing comes in two different varieties: front-page-first and back-page-first duplexing. Front-page-first duplexing involves imaging a page in a sequence of pages on one side of a pertinent imaging medium, and then imaging the next page in the sequence of pages on the other side of the imaging medium. Conversely, back-page-first duplexing involves imaging a page in a sequence of pages on one side of a pertinent imaging medium, and then imaging the prior page in the sequence of pages on the other side of the imaging medium.

N-up imaging involves imaging more than one image on a single side of a sheet of an imaging medium. The variable "N" in N-up image processing represents the number of images to be imaged on a single side of a sheet of the imaging medium. For example, using 4-up image processing, four images are imaged on to a single sheet by reducing the size of each image and positioning the four images on the sheet. In one embodiment, the images may be imaged on a sheet in row(s) and column(s).

Figure 2:
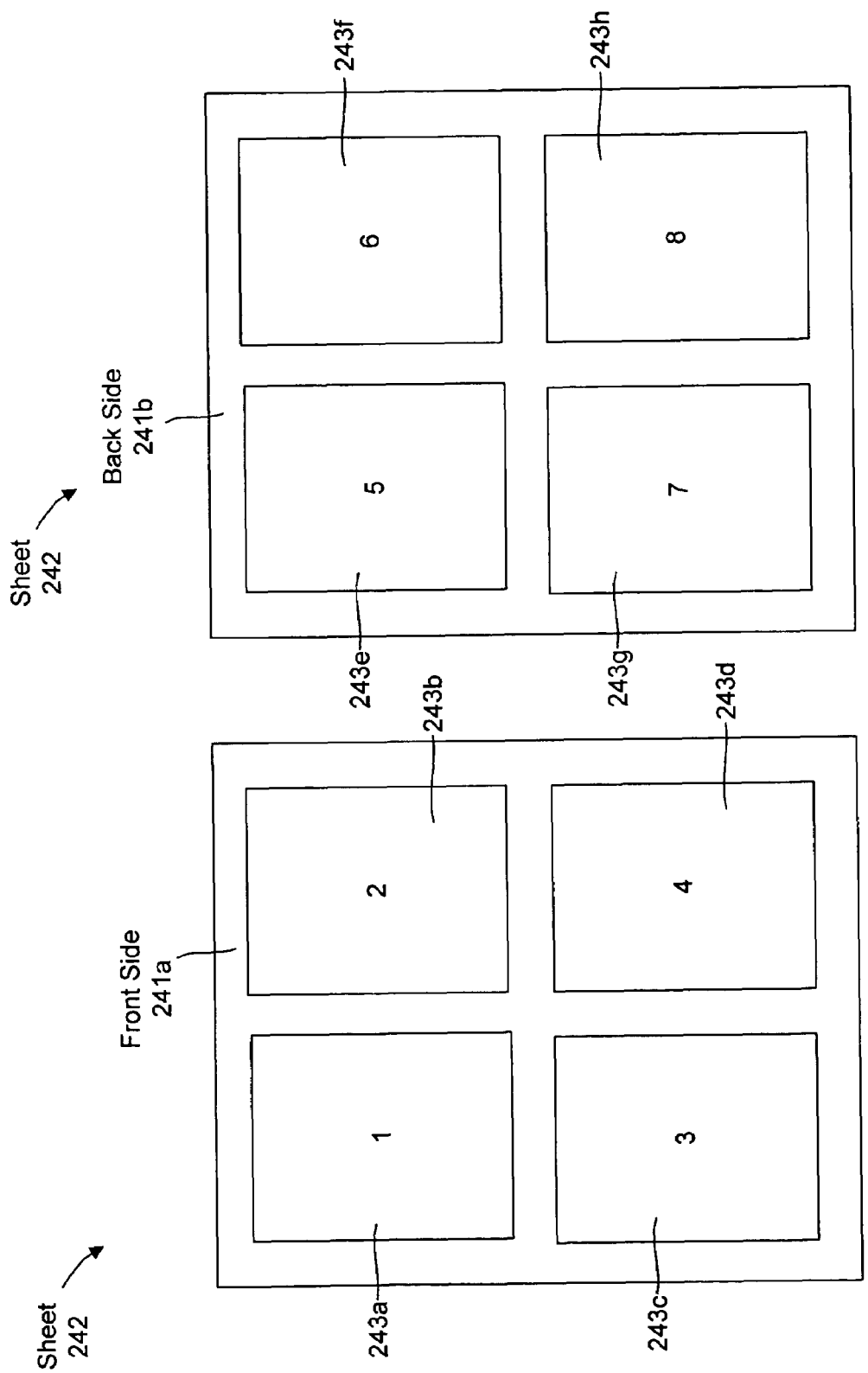
FIGS. 2A and 2B are diagrams illustrating the front and back sides, respectively, of a previously imaged sheet of imaging medium produced according to one embodiment of a disclosed imaging device.

Duplexing and N-up formatting may be combined to produce an N-up, duplex formatting. Using this type of formatting, N images are printed on each side of a sheet. FIGS. 2A and 2B, which will be discussed in detail below, are diagrams illustrating the front and back sides of a sheet of imaging medium when duplexing is active and N-up is set to "4." FIG. 3 is a table that explains the number of images to be stored before imaging is initiated depending on the duplex and N-up settings and, again, this figure will be explained in further detail below.

Referring again to FIG. 1, after determining 113 the number of images to be stored before imaging is initiated, image processing 121 begins. In one embodiment, image processing 121 involves three stages: (1) identifying 125 image boundaries between images; (2) transforming 127 image data for an image; and (3) storing 129 the transformed image data to a buffer. These three stages, in one embodiment, are performed for each image that needs to be stored before imaging is initiated.

By identifying 125 image boundaries (i.e., a beginning and an ending boundary for each image), image data for an image may be defined and identified. Depending on the format of the streaming image data 105, identifying 125 image boundaries may be performed a number of different ways, such as by identifying markers between each image or determining the location of an offset based on header information within streaming image data. Two embodiments of techniques for identifying 125 image boundaries will be discussed in connection with FIGS. 4-5.

Transforming 127 the identified image data comprises reformatting the image data into an image-ready format (i.e., a format that may be directly processed and imaged by the marking engine 117). In one embodiment, transforming 127 may include decompressing (if the image data is compressed), resizing (if necessary), color-space transforming, bit-depth transforming, and half-toning the image data. In one embodiment, these steps may be performed sequentially on sections or portions of the image data, rather than the entire image. One embodiment of the transformation process 127 will be discussed in further detail in connection with FIG. 6.

Following identification of image boundaries and transformation of image data for a particular image, the transformed image data is stored 129 in a buffer. The buffer may comprise memory of various types, such as volatile and nonvolatile memory.

The transformed image data is stored 129 in a buffer to form at least one rendered page that may be directly processed by the marking engine 117. The rendered page may include a single image or multiple images if the N-up setting is active. In one embodiment, when N-up formatting is used, stored image data for a particular image is placed in a memory location to form a rendered page in a configuration of rows and columns for imaging by the marking engine 117. As noted above, the stages 125, 127, 129 of image processing 121 may occur for each image that needs to be stored before imaging is initiated.

After the transformed image or images are stored 129 in the buffer, one of the rendered pages is transmitted to the marking engine 117 for imaging. The imaging may thus be initiated without waiting for all the streaming image data 105 to be received at the imaging device 101.

Prior art imaging devices wait for all the streaming image data to be received at the imaging device before any imaging is initiated. This is a slow process, particularly if the streaming image data is quite large. The systems and methods disclosed herein enable the imaging process to begin at an early stage without waiting for all the streaming image data 105 to be received at the imaging device 101.

FIG. 2A is a diagram illustrating the front side 241a of a previously imaged sheet 242 of imaging medium when duplexing is active and N-up is set to "4." FIG. 2B is a diagram of the back side 241b of the sheet 242. As illustrated, the images 243 have been reduced in size and imaged on the illustrated sheet 242, in rows and columns. For simplicity, graphical details of the images 243 are omitted from FIGS. 2A and 2B and only image boundaries are shown. Images 1-4 243a-d are positioned on the front side 241a of the sheet 242, while images 5-8 243e-h are positioned on the back side 241b of the sheet 242.

Of course, alternate configurations are possible within the scope of the systems and methods disclosed herein. In particular, the number of images imaged on the sheet 242 or the duplexing settings may be varied. For example, if the duplexing setting is inactive, images 1-4 243a-d would be imaged on the front side 241a of the sheet 242, and images 5-8 243e-h would be imaged on the front side of a second sheet. Alternatively, if the N-up setting is inactive and duplexing is active, image 1 243a would be displayed on the front side 241a of the sheet 242, while image 2 243b would be displayed on the back side 241b of the sheet 242. Spacing between each of the images 243 may also be altered from the spacing depicted in FIGS. 2A and 2B. In one embodiment, there is no space between the images 243 on a sheet 242.

FIG. 3 is a table 300 indicating the number of images to be stored before imaging is initiated according to one embodiment of the systems and methods disclosed herein. In the embodiment described in table 300, the duplexing settings 347 and N-up settings 349 control the number of images to be stored 351 before imaging is initiated. Of course, embodiments of the systems and methods disclosed herein, may involve, for example, only duplexing settings 347 or only N-up settings 349.

With respect to a first row 353a of the table 300, if duplexing and N-up are set to inactive, only one image will be stored before imaging is initiated. After storage as a rendered page, the transformed image data for the image will be transmitted to the marking engine 117 for imaging on a single side of a single sheet of an imaging medium.

With respect to the second row 353b of the table 300, if the duplexing is set to inactive and N-up is active, a set of N images will be stored as a rendered page before imaging is initiated. In one embodiment, the set of N images are stored such that the image data will be formatted as a rendered page having rows and columns of images when imaged by the marking engine 117. Following storage of the last image of the set of N images, the set of N stored images will be transmitted to the marking engine 117 as a rendered page for imaging. Thereafter, each set of N images will be transformed and stored in the buffer as a rendered page, and then transmitted to the marking engine 117 for imaging in sequence.

With respect to the third row 353c of the table 300, if duplexing is set to front-page-first and N-up is set to inactive, only one image will be stored as a rendered page before image data is transmitted to the marking engine 117. The first image will be imaged on one side of a sheet of an imaging medium without waiting for the second image to be stored. After the first image has been imaged, the stored second image will be transmitted as a rendered page to the marking engine for imaging on the other side of the sheet.

With respect to the fourth row 353d of the table 300, if duplexing is set to back-page-first and the N-up setting is inactive, two images will be stored before imaging is initiated. A first image will be stored as a rendered page, and then a second image will be stored as a rendered page. Thereafter, the second stored page will be transmitted to the marking engine 117 and imaged on one side of a sheet. The first stored page will then be retrieved from the buffer and transmitted to the marking engine 117 for imaging on the other side of the sheet.

With respect to the fifth row 353e of the table 300, if duplexing is set to front-page-first and the N-up setting is active, a first set of N images will be stored before imaging is initiated. The first set of N images will be stored as a rendered page and transmitted for imaging on one side of a sheet. Thereafter, the next set of stored N images, which may be processed and stored while imaging of the first N images is occurring, will be transmitted as a rendered page to the marking engine 117 for imaging on the other side of the sheet.

With respect to the sixth row 353f of the table 300, if duplexing is set to back-page-first and the N-up setting is active, 2N images will be stored before imaging is initiated. The first set of N images will be stored as a rendered page. Thereafter, the second set of N images will be stored as a rendered page. The second set of N images will be transmitted as a rendered page to the marking engine for imaging on one side of a sheet. Thereafter, the first set of N logical images will be transmitted as a rendered page to the marking engine for imaging on the other side of the sheet.

Figure 4:
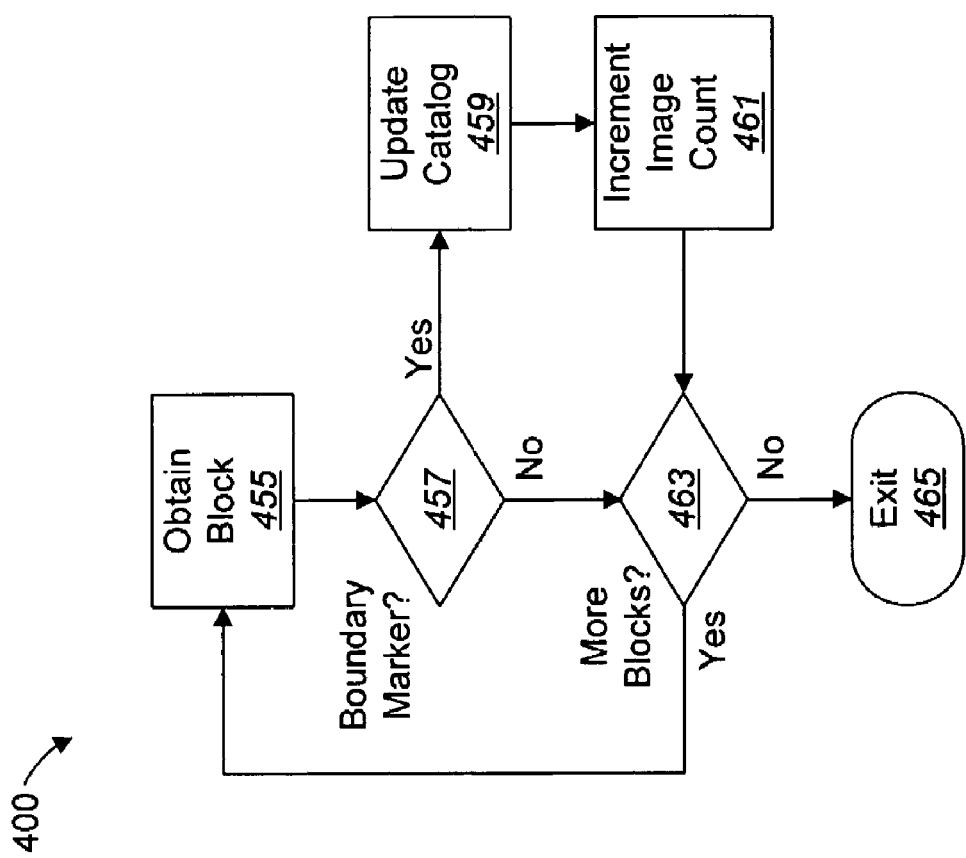
FIG. 4 is a flow diagram illustrating one embodiment of a method for identifying image boundaries and cataloging images within streaming image data.

FIG. 4 is a flow diagram illustrating one embodiment of a method 400 for identifying image boundaries and cataloging images within streaming image data 105. A block of data from the streaming image data 105 is first obtained 455. It is then determined 457 whether the block of data is an image boundary marker (e.g., a marker designating the end or beginning of an image). If it is an image boundary marker, a catalog to identify images is updated 459. The image count 461 is then incremented.

If the currently examined block is not an image boundary marker, it is determined 463 whether there are more blocks of data to be analyzed within the streaming image data. If there are no further blocks, the process 400 is terminated 465. If there are additional blocks to be analyzed, the procedure 400 is repeated to identify additional image boundaries. In one embodiment, image data for the cataloged images can be stored in one or more buffers or memory locations until further processing or transformation.

The foregoing procedure 400 may be implemented in connection with any image format that includes image boundary markers embedded within streaming image data 105. Such an image file format may include, for example, the joint photographic experts group (JPEG) file format.

Figure 5:
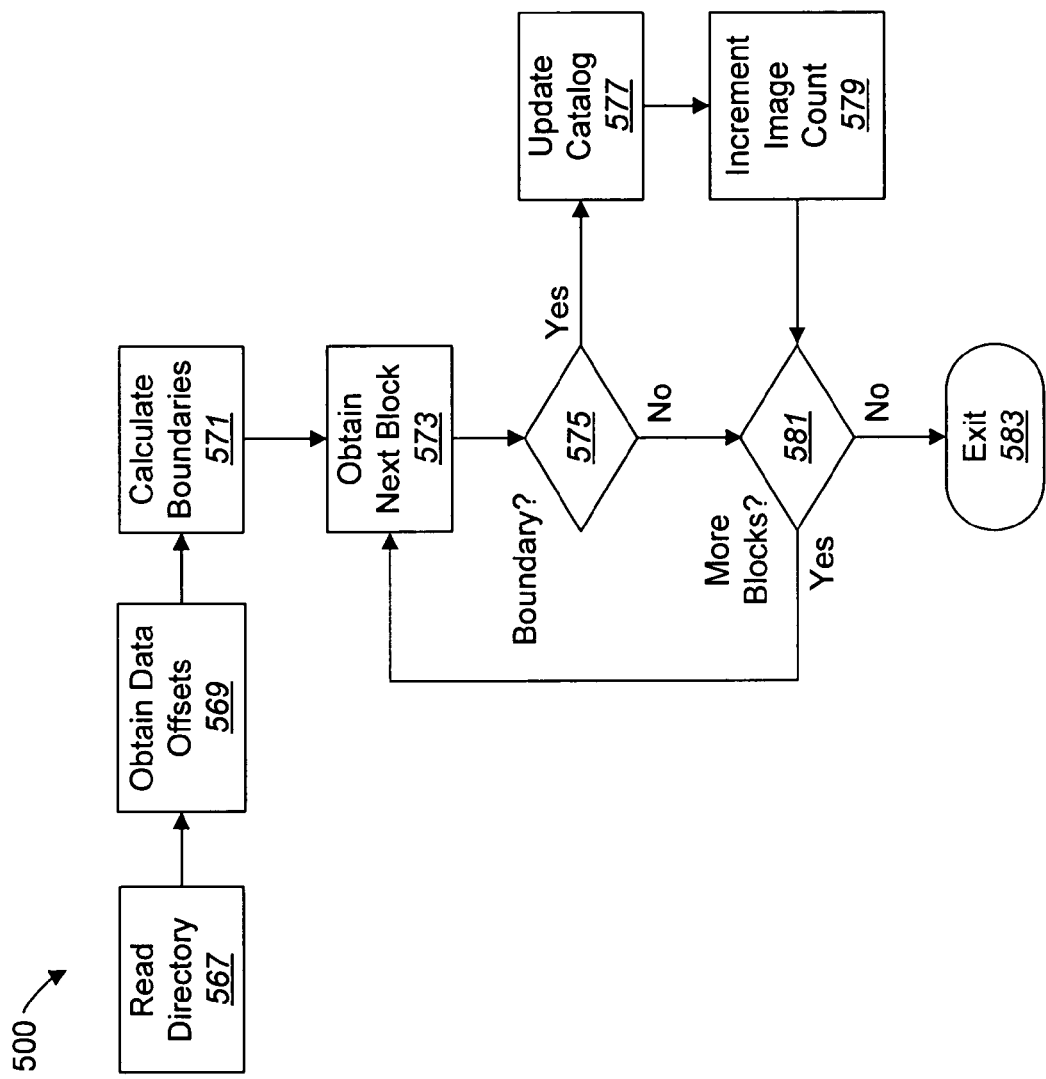
FIG. 5 is a flow diagram illustrating an alternative embodiment of a method for identifying image boundaries and cataloging images within streaming image data.

FIG. 5 is a flow diagram illustrating an alternative embodiment of a method 500 for identifying image boundaries and cataloging images within streaming image data 105. In this embodiment, the streaming image data includes a directory. The directory includes offsets, which may be used to compute image boundaries. The tagged image file format (TIFF) and potentially other image file formats employ such a directory system, with which the disclosed method 500 may be used.

The procedure 500 is initiated by reading 567 the directory found in the streaming image data 105. The offset or offsets are obtained 569 from the directory. Thereafter, an image boundary or boundaries are calculated 571 based on the offsets.

A next block of data from the streaming image data is then obtained 573. It is then determined 575 whether the block of data is one of the calculated boundaries. If it is one of the boundaries, a catalog used to identify/track images is updated 577. The image count 579 is then incremented. In one embodiment, image data for the cataloged images can be stored in one or more buffers or memory locations until further processing or transformation.

It is determined 581 whether there are more blocks of data to be analyzed. If there are no further blocks, the algorithm 500 is terminated 583. If there are additional blocks to be analyzed, the examination procedure is repeated to locate additional image boundaries.

Figure 6:
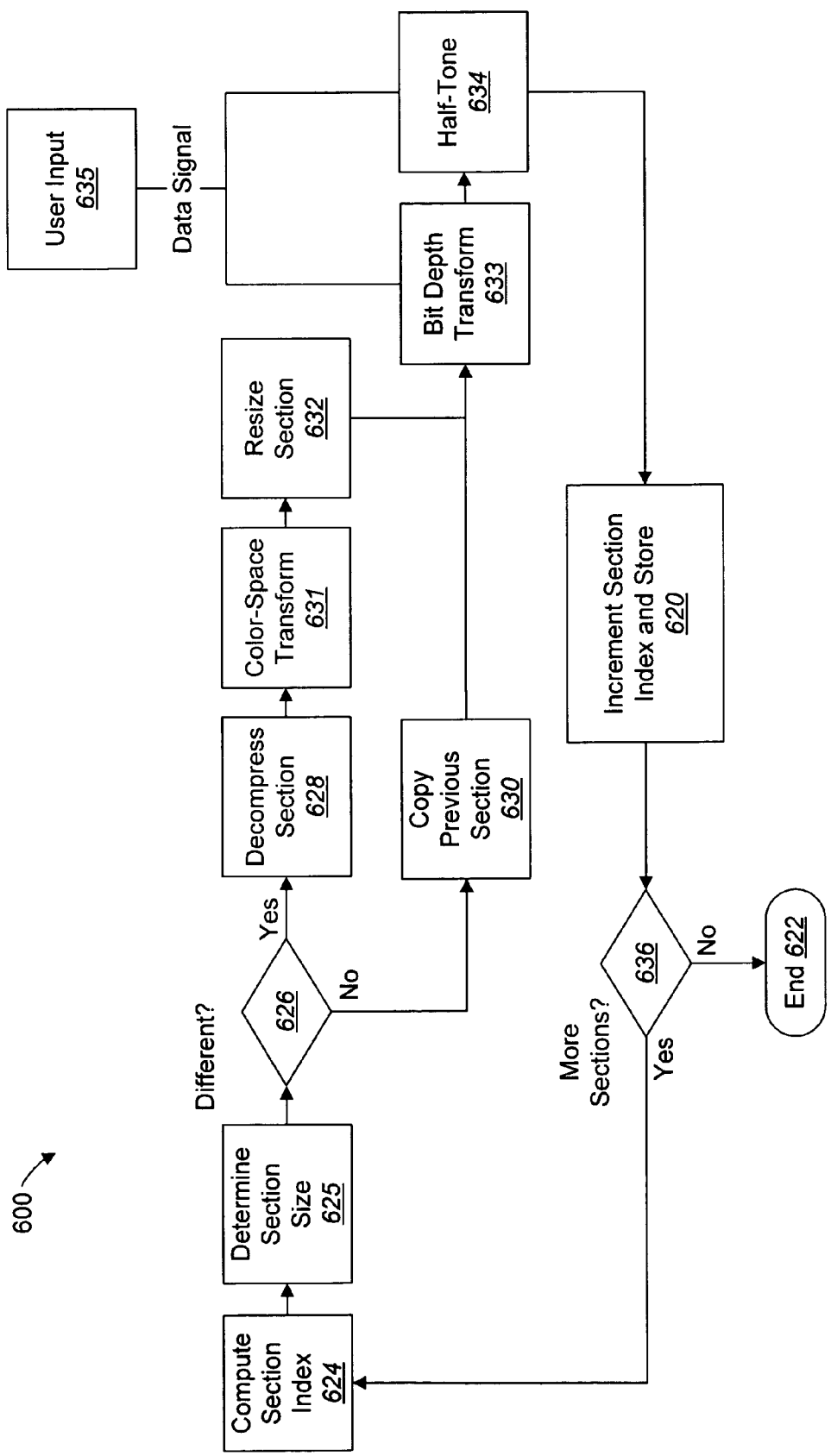
FIG. 6 is a flow diagram illustrating one embodiment of a method for transforming image data.

FIG. 6 is a flow diagram illustrating one embodiment of a method 600 for transforming the image data, which was briefly explained in connection with the transform block 127 of FIG. 1. In the illustrated embodiment, the image data may be transformed on a section-by-section basis. In one embodiment, the sections are rows or groups of rows within the image data.

Following receipt of streaming image data, the section index is computed 624. It is then determined 625 what the size of the next section should be. The size of the section indicates the number of scan lines or regions to be processed in a single pass by the disclosed method 600. The size of the section may be determined by reference to the image format of the streaming image data.

It is then determined 626 whether the new section is different from the previous section. If the new section is different, the new section is then decompressed 628, if the data is in a compressed format.

Thereafter, a color-space transformation 631 may be performed on the decompressed 628 section. The color-space transform 631 may, in one embodiment, be based on the parameters of the input image of one color-space (e.g., RGB color, gray scale of a specific number of bits per pixel, or black and white) and a specified output device (e.g., a printer) of another color-space (e.g., CMYK color, gray scale of a specific number of bits per pixel, or black and white). For example, if the output device is a printer that is only capable of printing in black-and-white, the color-space transform 631 process may convert a section, and ultimately all, of an input color or image into a black-and-white format. The transformation 631 may also involve converting a gray-scale image to a black-and-white image or a gray-scale image having a fewer number of bits per pixel. The transformation 631 may, in one embodiment, change the image data from an RGB (red green blue) format to a CMYK (cyan magnetic yellow black) format, which is commonly used by color printers. This transformation 631 could also involve bit depth transformation or other parameters that control how an image appears when printed or viewed following processing.

Thereafter, the section is resized 632, if appropriate or requested by a user. As indicated above, resizing of the image data may be appropriate when for example, N-up formatting is active.

If the new section is not different from the previous section, the previous section is copied 630 from a temporary storage location (e.g., volatile or non-volatile memory). In one embodiment, the stored version of the previous section has already been decompressed 628, color-space transformed 631, and/or resized 632. Accordingly, either one or all of these steps 628, 631, 632 may be skipped with respect to processing the previously stored section.

Thereafter, the section may optionally be transformed relative to bit depth 633 and half-toning method 634. In one embodiment, the bit depth 633 and half-toning method 634 are specified by a data signal generated in response to user input 635 (via, for example, a touchpad, or button). Alternatively, the bit depth 633 and half-toning method 634 may be specified using other techniques, such as by reference to an identified or default output device.

Following these processes, the section index is incremented and the processed section is stored 620. It is then determined 636 whether the digital image contains additional sections to be processed. If there are no additional sections to be processed, the procedure is terminated 622. If there are additional sections, the process is repeated for each subsequently identified section of the specified digital image. When all sections have been processed, the processed sections are then combined (or have been combined through saving the stored images in consecutive or specific memory locations) to produce an entire digital image in an image-ready format. Within the scope of the disclosed systems and methods, various steps of transforming the image data may be omitted or performed in a different order. For example, the decompressing or resizing procedures 628, 632 may be omitted if image data is not compressed or does not need to be resized. In one embodiment, the image data is of a proper color-space and thus the color-space transform 631 is a "null" transform.

Figure 7:
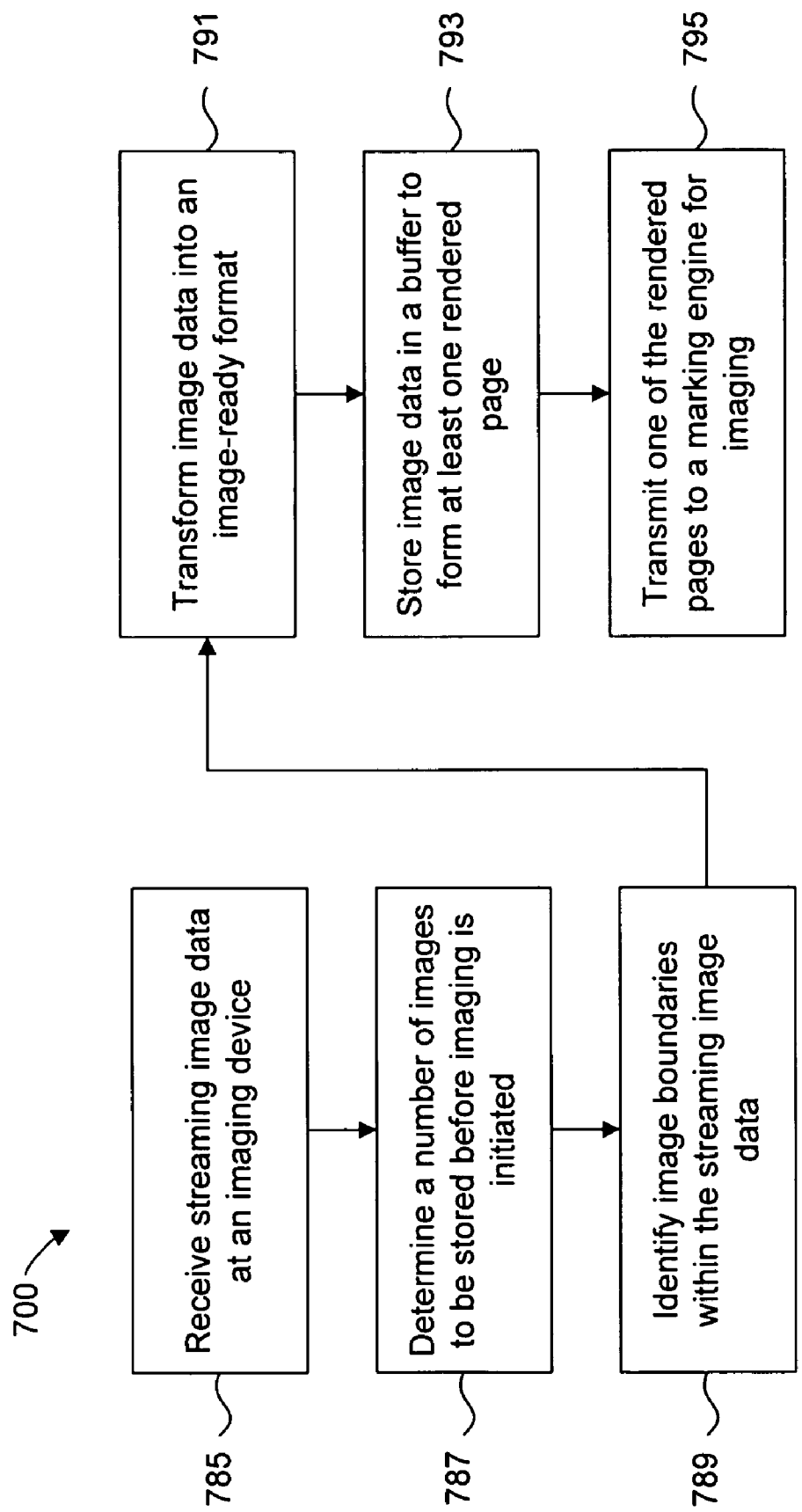
FIG. 7 is a flow diagram illustrating one embodiment of a method for imaging streaming image data comprising multiple images on an image-by-image basis.

FIG. 7 is a flow diagram illustrating one embodiment of a method 700 for imaging streaming image data 105 comprising multiple images on an image-by-image basis. Streaming image data is received 785 at an imaging device. The streaming image data may be embodied in various formats, such as a multi-page file where each page in the file comprises a separate image or a series of concatenated files such as concatenated joint photographic experts group (JPEG) files.

It is then determined 787 how many images need to be stored before imaging is initiated. As indicated in FIG. 3, in one embodiment, such a determination may be made based on duplexing and/or N-up settings.

Thereafter, image boundaries within the streaming image data are identified 789 for each image that needs to be stored before imaging is initiated (e.g., before processed image data is transmitted to the marking engine 117 for imaging). Each image, in one embodiment, is a separate page within the multi-page image file that is being streamed to the imaging device 101. As explained above, image boundaries may be identified 789 in various ways, such as by locating image boundary markers or calculating offsets from a directory.

After the image boundaries have been identified 789, the streaming image data for each of the images to be stored before imaging is initiated may be transformed 791 into an image-ready format. Image data in an image-ready format may be directly processed by the marking engine 117. Again, transformation 791 of the image data may involve, for example, decompressing, color-space transforming, resizing, bit depth transformation, and half-toning. Again, various steps of the transformation process may be omitted or performed in a different order within the scope of the disclosed systems and methods. The transformation may be performed, for example, on a section-by-section basis, on an entire image or on a section of the streaming image data greater than an image.

Thereafter, transformed image data (for each of the images to be stored before initiating imaging) is stored 793 in a buffer to form a rendered page that may be directly processed by the marking engine. Again, the rendered page may include a single image or multiple images. The buffer may be embodied as various types of memory. When all the streaming data for the images that need to be stored before imaging is initiated are stored in the buffer, at least one rendered page is transmitted 795 to a marking engine 117 for imaging. This imaging process may begin without waiting for all the streaming image data 105 to be received at the imaging device. Accordingly, imaging may be initiated more rapidly than prior art imaging devices.

As explained above, in certain embodiments, when duplexing or N-up settings are active, more than one image may be stored before imaging is initiated. However, even in such a case, imaging may be initiated before all the streaming image data has been received at the imaging device. Accordingly, the disclosed systems and methods produce an image more rapidly than prior art embodiments, even in diverse imaging scenarios.

Figure 8:
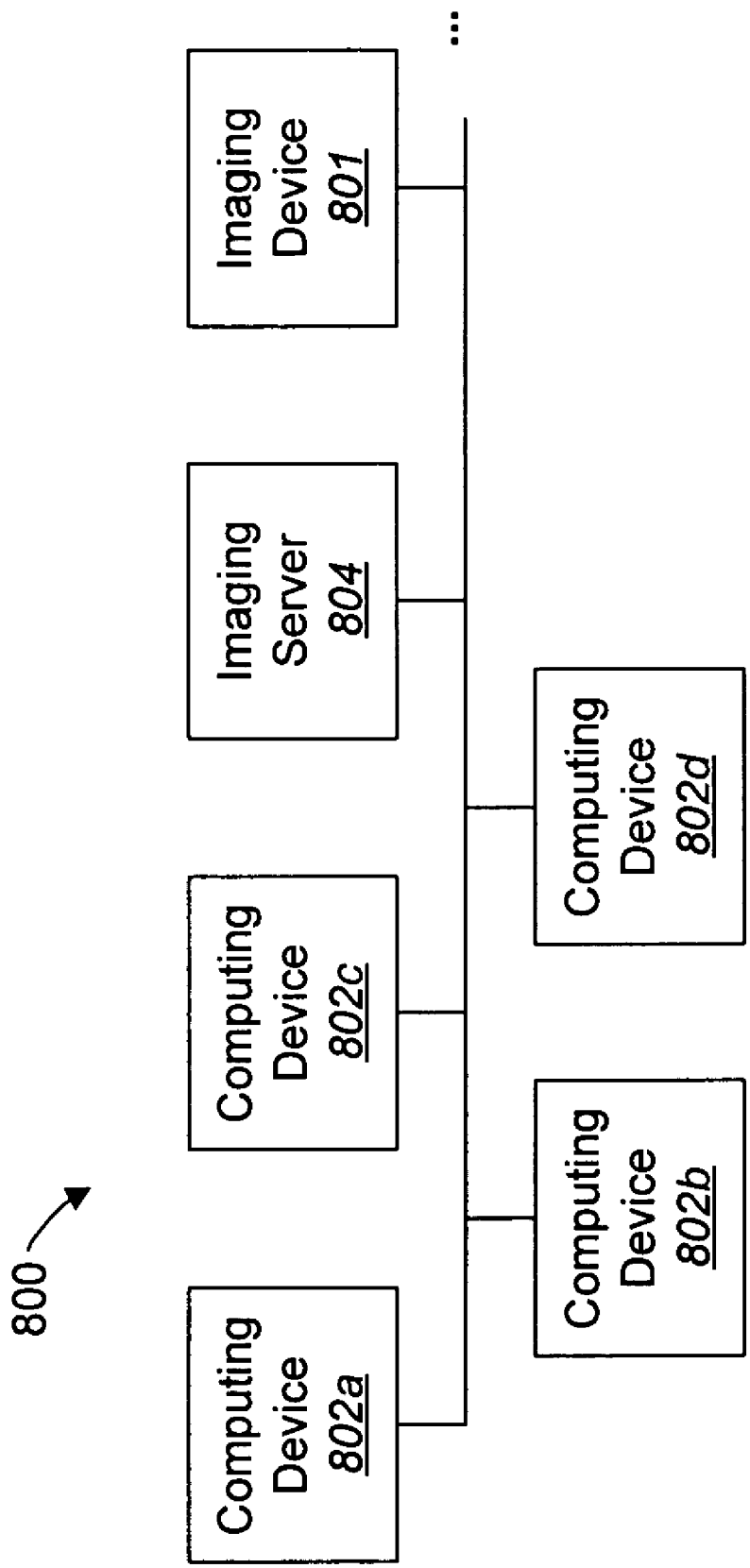
FIG. 8 is a network block diagram illustrating one possible environment in which the present imaging systems and methods may be implemented.

FIG. 8 is a network block diagram illustrating one possible environment 800 in which the present systems and methods may be implemented. In particular, FIG. 8 illustrates a computer network 800 comprising a plurality of computing devices 802, an imaging server 804, and an imaging device 801. Of course, the imaging device 801 disclosed herein is not necessarily implemented in a network environment but may be used, for example, by a direct parallel, serial, wireless, or USB connection to a computing device 802.

In the illustrated environment, streaming image data 105 may be generated by any one of the computing devices 802 and may be transmitted directly to the imaging device 801. Alternatively, the computing device 802, or client 802, may transmit image data to the imaging server 804 for processing or temporary storage before the image data is forwarded and streamed to the imaging device 801.

The computing device 802 may be embodied in a wide variety of different ways. For example, the computing device 802 may be a desktop computer, a personal data assistant (PDA), a tablet PC, a notebook computer, a cellular telephone, or any other type of computing device that is capable of transmitting image data.

Embodiments of the disclosed systems and methods may process streaming image data 105 of various types and in various formats. In one embodiment, no driver is required to process streaming image data before it is received by the imaging device 801. For example, the imaging device 801 may directly process streaming image data in a JPEG or a TIFF format.

Imaging devices 801 disclosed herein may include software, firmware, hardware and other forms that achieve the function described herein. The embodiments may be adapted to many environments with varying computing devices 802, operating systems, printing devices, network hardware and software, applications and other variables.

The embodiments disclosed operate independently of how transmission of the streaming image data is initiated. For example, an imaging job may be initiated by an application using a computing device 802 or may be initiated from the imaging device 801 itself, such as by connecting a portable storage device having stored images to the imaging device 801.

The term "network" 800 may refer to any combination of computing devices 802 and peripherals, such as imaging devices 801, wherein the devices can communicate with each other. The term "network" 800 may comprise local area networks (LANs), storage area networks (SANs), metropolitan area networks (MANs), wide area networks (WANs), and combinations thereof (e.g., the Internet) with no requirement that the client 802, imaging device 801, and server 804 reside in the same physical location, the same network 800 segment, or even in the same physical network 800. A network 800 may be internally interconnected or connected with other networks using conventional conductive cable, fiber-optic cable, phone line cable, power line cable or other electrical and light conductors and other signal transmission media as well as wireless connections using infrared, RF or other wireless methods, or combinations of the foregoing.

Figure 9:
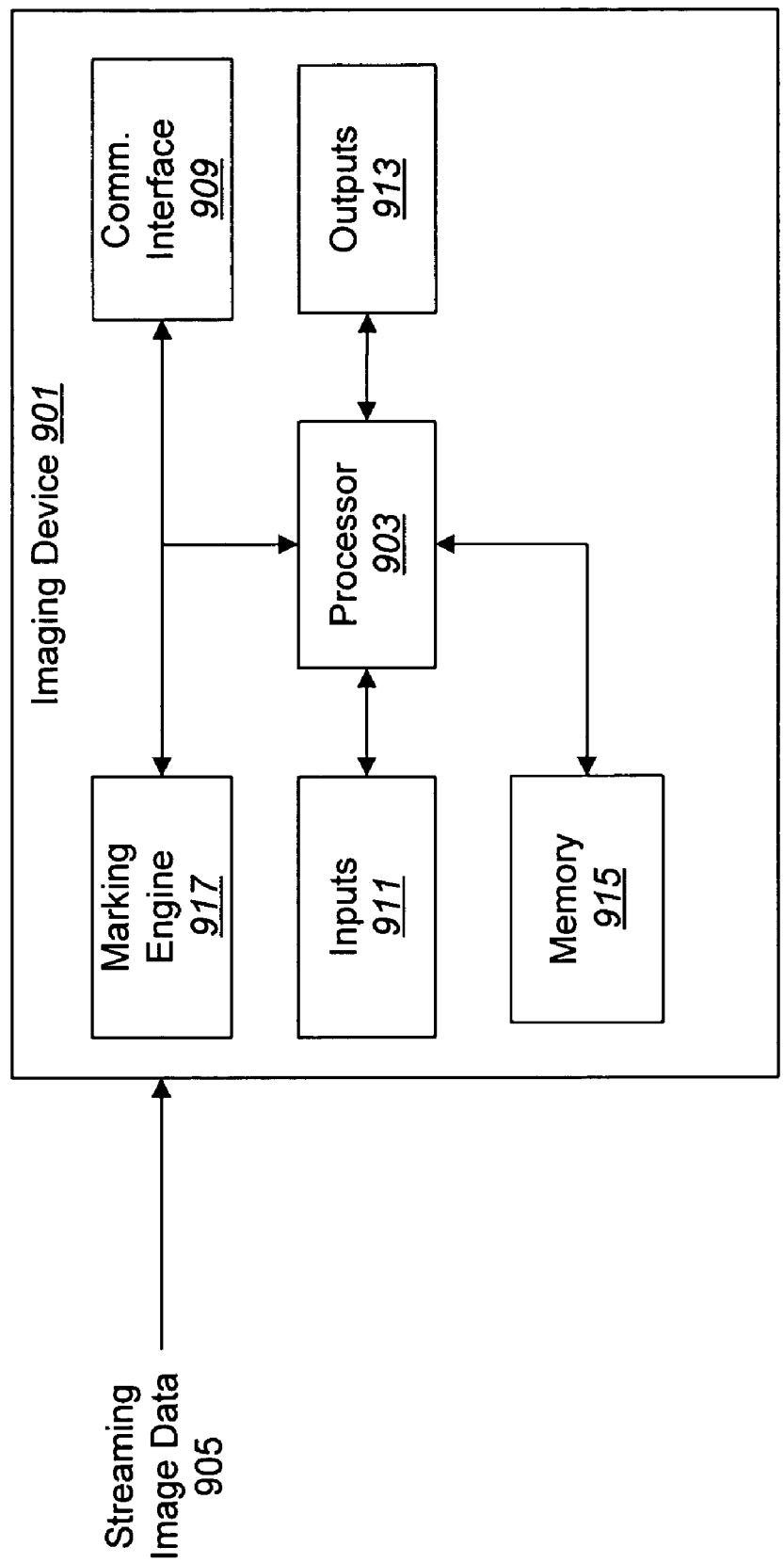
FIG. 9 is a block diagram illustrating the major hardware components typically utilized with embodiments of an imaging device.

FIG. 9 is a block diagram illustrating the major hardware components typically utilized with embodiments of an imaging device 901. As noted above, an imaging device 901 receives streaming image data 905 comprising multiple images and generates imaged output. As indicated above, imaging devices 901 include, but are not limited, to a multi-function peripheral ("MFP") (e.g., a printer/copier/scanner or printer/copier/fax machine), a printer, a copier, a fax machine, a plotter, a computer monitor, an electronic whiteboard, etc. The imaging device 901 may be a single or a plural grouping (e.g., pool or cluster) of two or more devices.

An imaging device 901 typically includes a processor 903 in electronic communication with various components of the imaging device 901. The processor 903 controls the operation of the imaging device 901 and may be embodied as a microprocessor, a microcontroller, a digital signal processor (DSP) or other device known in the art. The processor 903 typically performs logical and arithmetic operations based on program instructions stored within the memory 915.

The imaging device 901 may also include a marking engine 917 in communication with the processor 903. The marking engine 917 comprises the systems and components for creating an image based on received or processed image data. For example, if the imaging device is a printer (e.g., an inkjet, thermal dye sublimation, or laser printer) or a fax machine, the marking engine 917 comprises those components used to mark paper with the image specified by the image data. If the imaging device 901 is a display device, the marking engine 917 comprises those components used to display the image on the screen, in contrast to those components used to process the data received by the display device.

The processor 903 may also be in electronic communication with a communication interface 909. The communication interface 909 may be used for communications with computing devices, servers, other imaging devices, storage devices, etc. Thus, the communication interface 909 of the device 901 may be designed to send or receive signals from other devices (e.g., a computing device 802 shown in FIG. 8). The communication interface 909 may be based on wired communication technology, wireless communication technology, or both. Examples of different types of communication interfaces 909 include a serial port, a parallel port, USB, an Ethernet adapter, an IEEE 1394 bus interface, a small computer system (SCSI) bus interface, an infrared (IrDA) communication port, a Bluetooth wireless communication adapter, and so forth.

The processor 903 may operably be connected to various input 911 and/or output devices 913 capable of electronic communication with the processor 903, or, in other words, with devices capable of input and/or output in the form of an electrical signal. Embodiments of imaging devices 901 may include the inputs 911, outputs 913, and processor 903 within the same physical structure or in separate housings or structures. Examples of different kinds of input devices 911 include a keypad, keyboard, mouse, microphone, remote control device, button, joystick, trackball, touchpad, touch screen, lightpen, etc. Examples of different kinds of output devices 913 include an LCD screen (for displaying the status or selected features of the imaging device 901) and a speaker.

In one embodiment, the input device 911 (such as a touch screen or button) may be used to alter duplexing or N-up settings for the imaging device 901. An output device 913 (such as an LCD screen) could be used to indicate current duplexing or N-up settings or the procedures for altering those settings.

The imaging device 901 may also include memory 915. The memory 915 may be a separate component from the processor 903, or it may be on-board memory 915 integrated with the processor 903. For example, microcontrollers often include a certain amount of on-board memory. As used herein, the term "memory" 915 is broadly defined as any electronic storage medium, such as read-only memory (ROM), random access memory (RAM), magnetic disk storage media, optical storage media, flash memory devices, on-board memory included with the processor 903, EPROM memory, EEPROM memory, registers, etc. The memory 915 typically stores program instructions and other types of data. The program instructions may be executed by the processor 903 to implement some or all of the methods disclosed herein. The memory 915 may also be used as a queue (e.g., 109 of FIG. 1) or buffer in which to store streaming image data received by the imaging device 901.

In one embodiment, the imaging device 901 is an embedded device. An embedded device stores much, if not all, of its programming code in read-only memory. An embedded device is not a general purpose computer, but generally performs a specific purpose, such as imaging.

In addition, in one embodiment, the disclosed imaging device 901 is a driverless imaging device 901. In other words, streaming image data 905 does not need to be processed by a driver before processing (receiving, transforming, imaging, etc.) by the imaging device 901 to create an image.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array signal (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The methods disclosed herein comprise one or more steps or actions for achieving the described method. The method steps and/or actions may be interchanged with one another without departing from the scope of the present invention. In other words, unless a specific order of steps or actions is required for proper operation of the embodiment, the order and/or use of specific steps and/or actions may be modified without departing from the scope of the present invention.

While specific embodiments and applications of the present invention have been illustrated and described, it is to be understood that the invention is not limited to the precise configuration and components disclosed herein. Various modifications, changes, and variations which will be apparent to those skilled in the art may be made in the arrangement, operation, and details of the methods and systems of the present invention disclosed herein without departing from the spirit and scope of the invention.

What is claimed is:

1. A method for imaging streaming image data comprising multiple images on an image-by-image basis, comprising:
    receiving, at an imaging device, streaming image data comprising multiple images;
    determining a number of images to be stored before initiating imaging;
    identifying image boundaries within the streaming image data for each of the images to be stored;
    transforming image data corresponding to each of the images to be stored into image data in an image-ready format;
    storing the transformed image data in a buffer, wherein the image data is transformed before the storing and not after the storing, wherein the stored transformed image data is part of at least one rendered page, and wherein the stored transformed image data may be directly imaged by the marking engine; and
    transmitting one of the rendered pages to a marking engine for imaging without waiting for all the streaming image data to be received at the imaging device, wherein the one of the rendered pages comprises the stored transformed image data.

2. The method of claim 1, wherein the imaging device is an embedded device.

3. The method of claim 1, wherein the streaming image data does not need to be processed by a driver before processing by the imaging device.

4. The method of claim 1, wherein identifying image boundaries within the streaming image data comprises identifying at least one image boundary marker within the streaming image data.

5. The method of claim 1, wherein identifying image boundaries within the streaming image data comprises computing a specified offset within the streaming image data.

6. The method of claim 1, wherein the number of images to be stored before initiating imaging is determined by duplexing and N-up settings for the imaging device.

7. The method of claim 6, wherein the N-up setting is active.

8. The method of claim 7, wherein storing comprises storing the transformed image data in rows and columns to form one of the rendered pages.

9. The method of claim 6, wherein the N-up setting is active, and wherein the duplex setting is set to back-page-first.

10. The method of claim 9, wherein the number of images to be stored before initiating imaging is 2N, wherein N is the number of images to be imaged on one side of an imaging medium.

11. An imaging device for imaging streaming image data comprising multiple images on an image-by-image basis, the imaging device comprising:
    a processor;
    memory in electronic communication with the processor;
    a marking engine in electronic communication with the processor;
    instructions stored in the memory, the instructions being executable to:
        receive streaming image data comprising multiple images;
        determine a number of images to be stored before initiating imaging;
        identify image boundaries within the streaming image data for each of the images to be stored;
        transform image data corresponding to each of the images to be stored into image data in an image-ready format;
        store the transformed image data in a buffer, wherein the image data is transformed before the storing and not after the storing, wherein the stored transformed image data is part of at least one rendered page, and wherein the stored transformed image data may be directly imaged by the marking engine; and
        transmit one of the rendered pages to the marking engine for imaging without waiting for all the streaming image data to be received at the imaging device, wherein the one of the rendered pages comprises the stored transformed image data.

12. The imaging device of claim 11, wherein the imaging device is an embedded device.

13. The imaging device of claim 11, wherein the streaming image data does not need to be processed by a driver before processing by the imaging device.

14. The imaging device of claim 11, wherein identifying image boundaries within the streaming image data comprises identifying at least one image boundary marker within the streaming image data.

15. The imaging device of claim 11, wherein identifying image boundaries within the streaming image data comprises computing a specified offset within the streaming image data.

16. A printing device for printing streaming image data comprising multiple images on an image-by-image basis, the printing device comprising:
    a processor;
    memory in electronic communication with the processor;
    a marking engine in electronic communication with the processor;
    instructions stored in the memory, the instructions being executable to:
        receive streaming image data comprising multiple images;
        determine a number of images to be stored before initiating printing;

identify image boundaries within the streaming image data for each of the images to be stored;

transform image data corresponding to each of the images to be stored into image data in a print-ready format;

store the transformed image data in a buffer, wherein the image data is transformed before the storing and not after the storing, wherein the stored transformed image data is part of at least one rendered page, and wherein the stored transformed image data may be directly imaged by the marking engine; and transmit one of the rendered pages to the marking engine for imaging without waiting for all the streaming image data to be received at the imaging device, wherein the one of the rendered pages comprises the stored transformed image data.

17. The printing device of claim 16, wherein the printing device is an embedded device.

18. The printing device of claim 16, wherein the streaming image data does not need to be processed by a driver before processing by the printing device.

19. The printing device of claim 16, wherein identifying image boundaries within the streaming image data comprises identifying at least one image boundary marker within the streaming image data.

20. The printing device of claim 16, wherein the number of images to be stored before initiating imaging is determined by duplexing and N-up settings for the printing device.

* * * * *